(No Model.)
G. W. OWINGS.
HOSE COUPLING.
No. 579,804. Patented Mar. 30, 1897.
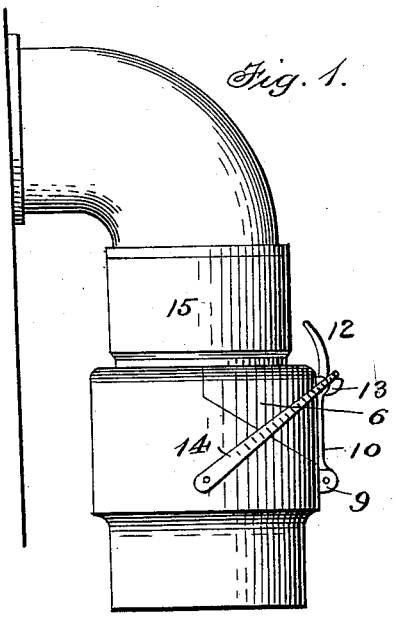
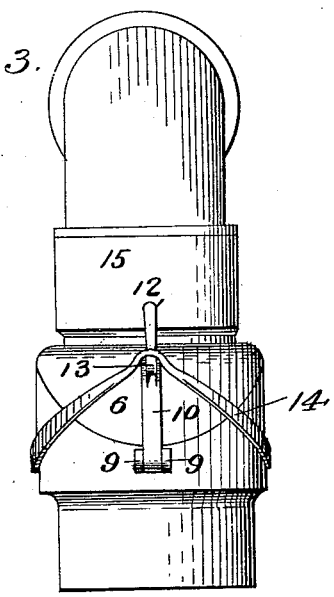
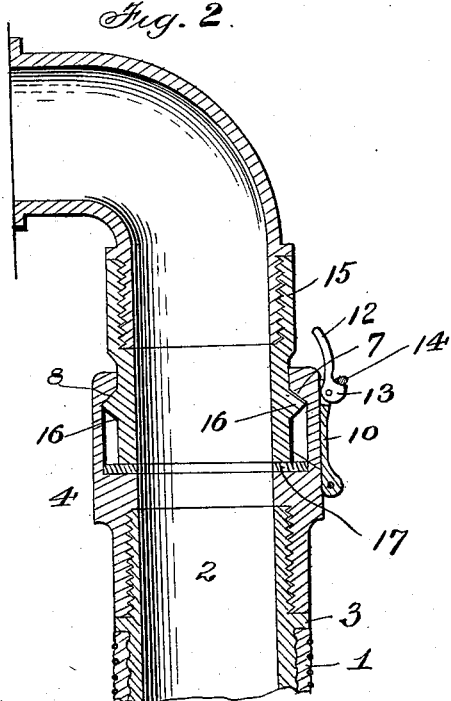
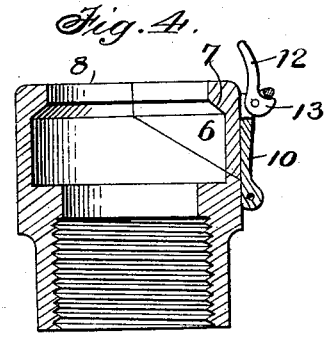
Witnesses:
Franck L. Ourand
Inventor:
George W. Owings,
Attorneys.

UNITED STATES PATENT OFFICE.

GEORGE W. OWINGS, OF RITTER, OREGON.

HOSE-COUPLING.

SPECIFICATION forming part of Letters Patent No. 579,804, dated March 30, 1897.

Application filed November 19, 1896. Serial No. 612,713. (No model.)

*To all whom it may concern:*

Be it known that I, GEORGE W. OWINGS, a citizen of the United States, and a resident of Ritter, in the county of Grant and State of Oregon, have invented certain new and useful Improvements in Hose-Couplings; and I do hereby declare that the following is a full, clear, and exact description of the invention, which will enable others skilled in the art to which it appertains to make and use the same, reference being had to the accompanying drawings, which form a part of this specification.

My invention relates to an improved device for connecting garden and other hose to a hydrant; and its object is to provide a novel construction by which the hose can be connected to the hydrant in a rapid and efficient manner.

In the ordinary manner of securing a hose to a hydrant or street-plug the hose is provided with a female coupling which is secured to a corresponding nozzle on the hydrant and plug. This is a tedious and laborious operation, which is avoided by my invention, which enables the hose to be almost instantly connected with and disconnected from the hydrant or plug.

The invention consists in the novel construction and combination of parts hereinafter fully described and claimed.

In the accompanying drawings, Figure 1 is a side elevation showing my invention connected with the spout of a hydrant. Fig. 2 is a longitudinal section of the same. Fig. 3 is an elevation of the coupling, taken in a plane at a right angle to Fig. 1. Fig. 4 is a longitudinal section of the coupling detached.

In the said drawings the numeral 1 designates a portion of a garden or other hose provided with a screw-threaded nipple 2, formed with an annular flange 3.

The numeral 4 designates a coupling consisting of a cylindrical section screw-threaded at one end and secured to said nipple. At the other end said section is cut away on a bevel to receive a segmental clamp 6, corresponding with said cut-away portion, so that when said clamp is secured to the coupling the latter will present a cylindrical appearance. This clamp is provided with an inwardly-extending flange 7, which coincides with a similar flange 8 on the coupling. Pivoted to lugs 9 on said clamp is a lever 10, which abuts against the clamp. To the free end of this lever is pivoted a hand-lever 12, provided with a shoulder 13, which engages with a bail or yoke 14, pivoted to the coupling.

The numeral 15 designates a nipple adapted to be screwed onto the nozzle of a hydrant and provided with a peripheral flange 16, with which the flange of the coupling and clamp engage.

The numeral 17 designates a washer.

The operation is as follows: The nipple 15 is permanently secured to the hydrant spout or nozzle, while the nipple 1 and coupling are secured to the hose. To secure the coupling to coupling 4 the lever 12 is turned down, releasing lever 10 and bail 14 and allowing the clamp to be removed. The coupling is then slipped on nipple 15 and the clamp replaced and held in place by the yoke and levers, making a tight joint and securely connecting the coupling with the hydrant.

Having thus fully described my invention, what I claim is—

The combination with the screw-threaded coupling cut away on a bevel at one end, and formed with an inwardly-extending flange, of the segmental clamp having a corresponding flange, the lever pivoted to the coupling, the catch pivoted to said lever, the pivoted yoke or bail engaging therewith and the nipple formed with an annular peripheral flange; substantially as described.

In testimony that I claim the foregoing as my own I have hereunto affixed my signature in presence of two witnesses.

GEORGE W. OWINGS.

Witnesses:
S. F. FAULKENBERRY,
ORIN L. PATTERSON.